United States Patent [19]
Mizuguchi et al.

[11] Patent Number: 5,404,680
[45] Date of Patent: Apr. 11, 1995

[54] METHOD FOR POLISHING SLIGHT AREA OF SURFACE OF WORKPIECE AND TOOL THEREFOR

[75] Inventors: Shinichi Mizuguchi, Osaka; Koji Kato; Noritsugu Umehara, both of Miyagi, all of Japan

[73] Assignee: Matsushita Electric Industrial Co., Ltd., Osaka, Japan

[21] Appl. No.: 213,812

[22] Filed: Mar. 16, 1994

Related U.S. Application Data

[63] Continuation of Ser. No. 881,469, May 11, 1992, Pat. No. 5,317,840.

[30] Foreign Application Priority Data

May 9, 1991 [JP] Japan ................. 3-103031

[51] Int. Cl.$^6$ ................. B24B 1/00
[52] U.S. Cl. ................. 451/36; 451/165; 451/1
[58] Field of Search ............ 51/59 SS, 165 R, 165.71, 51/165.75, 165.76, 165.77, 281 R, 317, 318, 7, 57, 58

[56] References Cited
U.S. PATENT DOCUMENTS

| | | | |
|---|---|---|---|
| 2,834,158 | 1/1955 | Petermann | 51/59 SS |
| 3,427,480 | 6/1966 | Robinson | 51/59 SS |
| 3,482,360 | 12/1969 | Legge | 51/59 SS |
| 4,821,466 | 4/1989 | Kato et al. | 51/317 |
| 4,934,103 | 6/1990 | Campergue et al. | 51/59 SS |
| 4,977,707 | 12/1990 | Chachin et al. | 51/317 |
| 5,054,244 | 10/1991 | Takamatsu et al. | 51/165.71 |
| 5,076,026 | 12/1991 | Mizuguchi et al. | 51/59 SS |
| 5,185,957 | 2/1993 | Mizuguchi et al. | |

FOREIGN PATENT DOCUMENTS

| | | |
|---|---|---|
| 57-163057 | 10/1982 | Japan . |
| 73272 | 4/1984 | Japan ................ 51/59 SS |
| 60-118466 | 6/1985 | Japan . |
| 61-244457 | 10/1986 | Japan . |
| 1-16623 | 3/1989 | Japan . |
| 4-75878 | 3/1992 | Japan . |

*Primary Examiner*—Jack W. Lavinder
*Attorney, Agent, or Firm*—Wenderoth, Lind & Ponack

[57] ABSTRACT

A method for polishing a slight region of the surface of a workpiece utilizes an actuator or actuators having piezoelectric elements. The actuators cause slight movement of a polishing portion disposed at the leading end of a polishing tool in an XY-direction parallel with the surface of the workpiece and/or a Z-direction perpendicular to the surface of the workpiece. A polishing material, including a magnetic fluid and nonmagnetic abrasive grains dispersed in the magnetic fluid, is held magnetically in a space between the polishing portion and the workpiece.

2 Claims, 11 Drawing Sheets

METHOD FOR POLISHING SLIGHT AREA OF SURFACE OF WORKPIECE AND TOOL THEREFOR

This application is a continuation of now abandoned application Ser. No. 07/881,469, filed on May 11, 1992, now U.S. Pat. No. 5,317,840.

BACKGROUND OF THE INVENTION

The present invention relates to a method for polishing a slight region of the surface of a workpiece with an extremely high precision, such as a lens or an optical element, and to a tool for carrying out the method.

The surfaces of nonspherical lenses and X-ray optical elements incorporated in electronic instruments or optical instruments are polished in manufacturing them. There is a demand for a method for precisely processing areas of 0.01 $\mu$m and smaller. In order to comply with such a demand, it is necessary to develop a method for precisely polishing a slight region of the entire surface of a workpiece.

Conventionally, a polishing process or a lapping process has been adopted to abrade or polish the workpiece with high precision. But it is impossible for the conventional methods to precisely polish areas of 0.01 $\mu$m and smaller. In recent years, a magnetic polishing method which uses magnetic polishing fluid as a polishing material is noteworthy in that the method is capable of polishing with high precision. The magnetic polishing fluid refers to magnetic fluid alone or a mixture comprising magnetic fluid and a polishing material of fine grain which is dispersed and suspended in the magnetic fluid.

According to the magnetic polishing method, the magnetic polishing fluid is supplied between the polishing portion disposed at the leading end of a polishing tool and a workpiece and a magnetic field is applied therebetween. As a result, the magnetic polishing fluid is magnetically held between the polishing portion and the surface of the workpiece pressurized by the magnetic polishing fluid. A high speed rotation of the polishing tool causes the magnetic polishing fluid to rotate at a high speed. Thus, the magnetic polishing fluid polishes the surface of the workpiece. In order to improve the polishing performance of this method, the direction and magnitude of the magnetic field are varied to change the pressure applied by the magnetic polishing fluid to the surface of the workpiece and control the motion of the magnetic polishing fluid. The magnetic polishing method is disclosed in Japanese Laid-Open Patent Publication No. 60-118466 and No. 61-244457, and Japanese Patent Publication No. 1-16623.

According to the magnetic polishing method, a magnetic coercive force allows the polishing material to intensively act on a slight region of the surface of the workpiece. Thus, the surface of the workpiece may be polished with a higher precision than with the conventional polishing method previously described. However, it is difficult for the magnetic polishing method to precisely polish the workpiece in an area of 0.01 $\mu$m or smaller.

That is, according to the magnetic polishing method, the magnetic polishing fluid is rotated at a high speed by the high speed rotation of the polishing tool. Therefore, the polishing performance is determined by the rotational state of the polishing tool. That is, the number of rotations of the polishing tool is liable to vary or the shaft thereof is liable to dislocate from its axis. Thus, the amount of abrasion is different from piece to piece; the polishing operations are non-uniform; and the surface polishing may be dislocated from the surface which is desired to be polished. There are spacial allowances in the operation mechanism, e.g. a rotary mechanism, so that each member is capable of carrying out a smooth motion. Consequently, the polishing portion disposed at the leading end of the polishing tool unavoidably undergoes a small amount of movement. Therefore, it is inevitable that the surface of the workpiece is polished uniformly throughout the surface. That is, so long as the polishing portion is rotated at a high speed, it is impossible to prevent the occurrence of the above-described problems.

According to the above-described conventional magnetic polishing method carried out by rotating the polishing tool at a high speed, the force for pressing the magnetic polishing fluid against the surface of the workpiece is generated not by the rotation of the polishing tool but by the application of a magnetic field. Therefore, unless a strong magnetic field is applied, a sufficient polishing force is not generated and the amount of abrasion varies depending on the magnitude of the magnetism. Consequently, according to this method, it is necessary to provide the polishing apparatus with a large-scale magnetism generating means such as an electro-magnet and to strictly control the magnetic force. In addition, it is necessary for the workpiece to constitute a part of a magnetic circuit for the generating magnetism. That is, the workpiece needs to be composed of a magnetic substance except in the case of a thin workpiece. When the surface of thin workpiece is polished, the force to be applied by the magnetic polishing fluid to the surface of the workpiece is changed due to a slight fluctuation in the thickness of the workpiece or due to a change in magnetic properties. Thus, it is difficult to control the amount of abrasion or the polishing precision. This method may not be applied to a lens or an optical element because the lens and the optical element are made of nonmagnetic material and are considerably thick.

In order to overcome the problems of the above-described conventional magnetic polishing method, the present inventors developed a method for polishing a slight region of a workpiece and a polishing tool for carrying out the method (see U.S. Ser. No. 07/708,867, filed May 31, 1991, by Shinichi Mizuguchi et al.). According to the method, the workpiece may be polished without being influenced by the magnetic properties thereof and may be preferably applied to a workpiece made of a nonmagnetic material. More specifically, an actuator (or actuators) comprising a piezoelectric element moves the polishing portion slightly in an XY-direction parallel with the surface of the workpiece and/or a Z-direction perpendicular to the surface of the workpiece. The slight movement of the polishing portion is transmitted to the magnetic polishing fluid to polish the surface of the workpiece, with pressure mechanically applied to the space between the polishing portion and the workpiece.

According to this novel polishing method and the polishing tool therefor, it is unnecessary to rotate the polishing portion at a high speed. In addition, it is unnecessary for the workpiece to constitute a component of a magnetic circuit in order to hold the magnetic polishing fluid between the workpiece and the polishing portion and apply pressure to the magnetic polishing fluid. Thus, this method is capable of solving the problems of the conventional polishing method carried out by rotating the polishing tool at a high speed.

According to this polishing method of the present inventors, the Z-direction actuator comprising the piezoelectric element presses the magnetic polishing fluid against the workpiece through the polishing portion and moves the polishing portion slightly along the surface of the workpiece. Thus, the surface of the workpiece is polished. That is, the XY-direction actuator or the Z-direction actuator moves the magnetic polishing fluid slightly in a horizontal and/or vertical direction with respect to the surface of the workpiece, and the Z-direction actuator cause the magnetic polishing fluid to be mechanically pressed against the surface of the workpiece.

According to this method, it is unnecessary to rotate the polishing portion. Therefore, the number of rotations of the polishing tool does not vary or the shaft thereof does not dislocate from the axis thereof. As a result, the surface of the workpiece may be abraded to approximately the same depth and the surface roughness is the same throughout the surface. The actuator comprising the piezoelectric element has neither mechanical sliding portions nor mechanical operating mechanisms and as such accurately operates according to an applied voltage. Therefore, the motion of the magnetic polishing fluid is stable. In this respect, the surface of the workpiece may be abraded to approximately the same depth and degree throughout the surface thereof. The area of movement of the magnetic polishing fluid made by the XY-direction actuator is much smaller than that of the rotary motion adopted by the conventional method described previously. Thus, the surface of the workpiece may be finely polished to a mirror-like surface finish.

According to this polishing method, pressure for mechanically pressing the magnetic polishing fluid against the workpiece may be applied by the Z-direction actuator comprising the piezoelectric element. Therefore, it is unnecessary to provide the polishing apparatus with a magnetic circuit connecting the polishing portion to the workpiece. Accordingly, a workpiece made of a nonmagnetic substance may be abraded and the pressure to be applied to the workpiece may be controlled by a voltage to be applied thereto irrespective of the difference in the magnetic properties of the workpiece caused by the material quality of the workpiece and the thickness thereof. Thus, the material quality of the workpiece and the configuration thereof do not affect the abrasive efficiency or the abrasive precision of this method. In addition to a workpiece made of a magnetic substance such as steel which may be polished by the above-described conventional polishing method, this method is capable of polishing a workpiece made of a nonmagnetic substance such as glass or ceramic which may not be polished by the above-described conventional polishing method. Further, this method polishes the workpiece irrespective of its thickness and to a plane, spherical or free-curved configuration.

According to this method, the polishing portion moves slightly along the surface of the workpiece by applying a voltage to the piezoelectric element. Thus, the magnetic polishing fluid is capable of polishing the workpiece by polishing a slight region with the polishing portion at high precision. As a result, the entire surface of the workpiece may be polished to approximately the same depth and quality by performing such a polishing operation over the whole surface of the workpiece. This method is capable of polishing the workpiece much more uniformly, to a mirror-like surface finish, and in an area of 0.1 $\mu$m, compared with the conventional polishing method described previously, with ease and reliability.

However, later research carried out by the present inventors revealed that the method and the tool therefor have the following disadvantages.

That is, it is difficult for the method to accurately control the amount of abrasion and then make use computer controlled polishing. In addition, the surface roughness is different from piece to piece.

SUMMARY OF THE INVENTION

It is an essential object of the present invention to provide a method, for polishing a slight region of the surface of a workpiece, capable of precisely controlling an amount of abrasion and providing a small and constant surface roughness and a polishing tool for carrying out the method.

In accomplishing this and other objects, according to one aspect of the present invention, there is provided a method for polishing a slight region of a surface of a workpiece, comprising the steps of:

applying a magnetic field to a space between a polishing portion disposed at a leading end of a polishing tool and the workpiece to magnetically hold a polishing material in the space between the polishing portion and the workpiece, the polishing material including magnetic fluid and nonmagnetic abrasive grains dispersed in the magnetic fluid;

applying pressure mechanically in the space between the surface of the workpiece and the polishing portion; and moving slightly, by an actuator or actuators each comprising a piezoelectric element, the polishing portion disposed at the leading end of the polishing tool in an XY-direction parallel with the surface of the workpiece and/or a Z-direction perpendicular to the surface of the workpiece to polish the slight region of the surface of the workpiece with the polishing material.

According to another aspect of the present invention, there is provided a polishing tool for polishing a slight region of a surface of a workpiece, comprising:

a polishing portion opposed to the surface of the workpiece;

an XY-direction actuator, comprising a piezoelectric element, for moving the polishing portion slightly in an XY-direction (i.e. in an X-Y plane) parallel with the surface of the workpiece;

a Z-direction actuator, comprising a piezoelectric element which contracts or expands, for moving the polishing portion slightly in a Z-direction perpendicular to the surface of the workpiece; and a magnetic field applying means for applying a magnetic field to the space between the polishing portion and the surface of the workpiece so as to hold a polishing material, including magnetic fluid and nonmagnetic abrasive grains dispersed in the magnetic fluid, between the polishing portion and the surface of the workpiece.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1A:
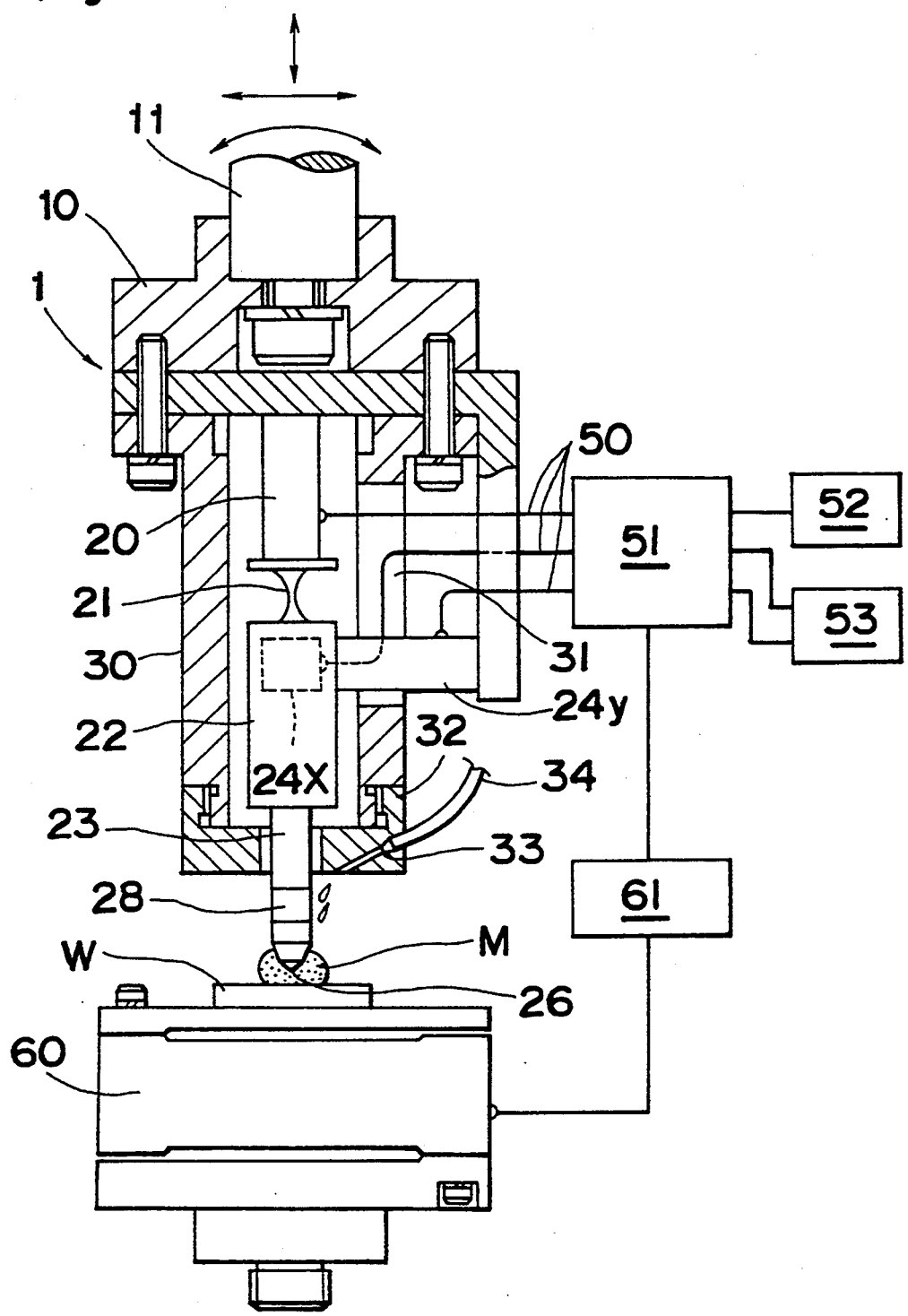
FIGS. 1A and 1B are a sectional view and a partial perspective view showing a polishing tool of a polishing apparatus to be used to carry out a method for polishing a slight area of the surface of a workpiece according to one embodiment of the present invention.

Before the description of the present invention proceeds, it is to be noted that like parts are designated by like reference numerals throughout the accompanying drawings.

Figure 1B:
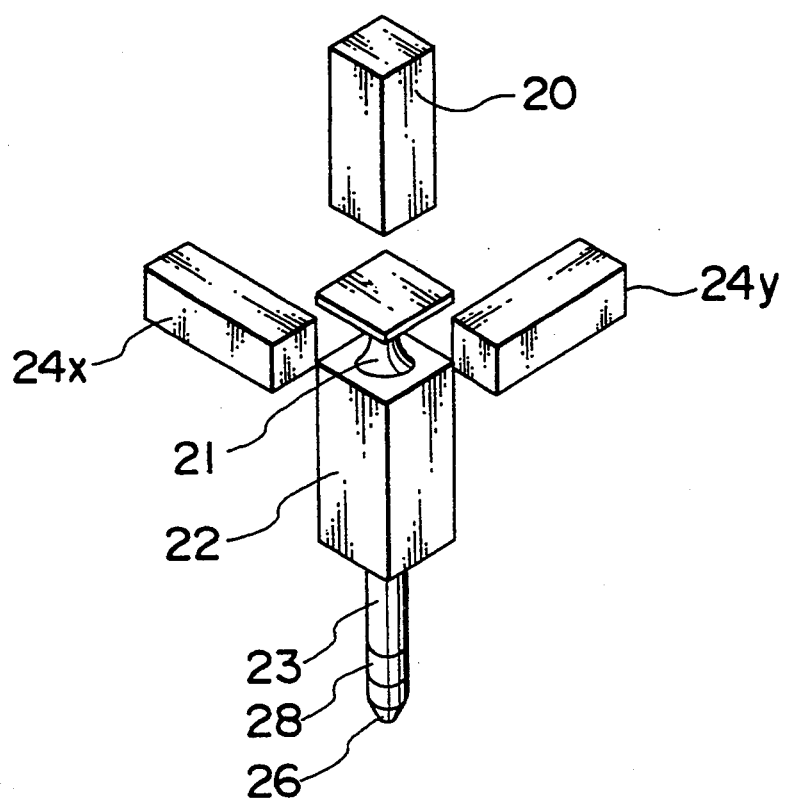

FIGS. 1A and 1B show a polishing tool of a polishing apparatus for carrying out the method according to one embodiment of the present invention. The main body 10 of a polishing tool 1 is fixed to the main body (not shown) of the apparatus through a supporting shaft 11. The supporting shaft 11 is capable of moving horizontally and vertically and inclining at a desired angle. The operating mechanism of the supporting shaft 11 is similar to that of an ordinary shaft of a machine tool.

A Z-direction actuator 20 is disposed at the center of the lower surface of the main body 10. A block 22 is hung from the lower end surface of the Z-direction actuator 20 through a connecting portion 21 having a pair of spherical surfaces at its upper and lower ends and an elastic narrow portion at its middle. Thus, the rigidity of the connecting portion 21 in the vertical direction is larger than that in the transverse direction. The connecting portion 21 allows for the slight movement of the block 22 with respect to the Z-direction actuator 20 in XY-directions perpendicular to the Z-direction and for reliably transmitting the slight movement of the Z-direction actuator 20 in the Z-direction, i.e. a vertical direction, to the block 22. A polishing shaft 23 is integrally connected with the lower end surface of the block 22. A leading end of an X-direction actuator 24x is connected along the X-direction to a side surface of the block 22, and the leading end of a Y-direction actuator 24y is connected along the Y-direction to a side surface of the block 22. The Z-direction actuator 20, the X-direction actuator 24x, and the Y-direction actuator 24y comprise a plurality of thin piezoelectric elements laminated one on the other and expand or contract in the Z-direction (axial direction of the polishing shaft 23), the X-direction, and the Y-direction, respectively, upon application of a voltage, thus pressing a polishing material in the Z-direction against a workpiece W and moving the polishing material freely along the surface of the workpiece W due to slight movements in the X-direction and the Y-direction.

The following specifications for the Z-direction actuator 20, the X-direction actuator 24x, and the Y-direction actuator 24y may be used:

Dimensions—5 mm square and 18 mm in length; rated voltage—100 V; displacement amount—15 $\mu$m/100 V; and excitation frequency—10 to 300 Hz.

The polishing shaft 23 is tapered toward the leading end thereof which is spherical. The spherical surface serves as a polishing portion 26.

Figure 2:
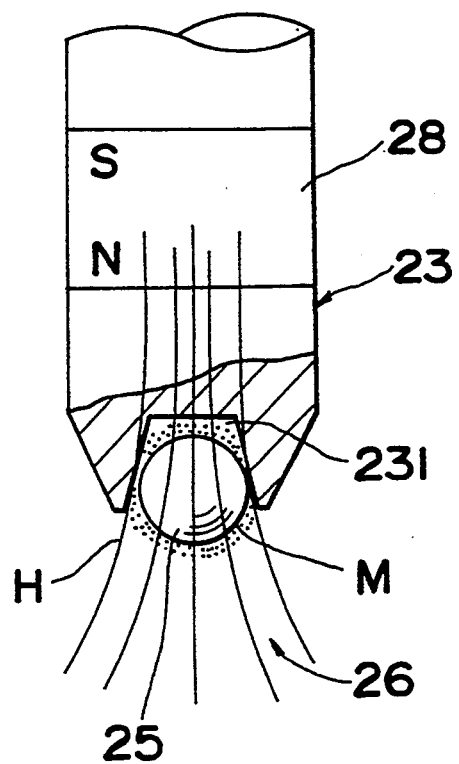
FIG. 2 is a sectional view showing an example of the construction of members disposed in the vicinity of the polishing portion of the polishing tool shown in FIG. 1.
Figure 3:
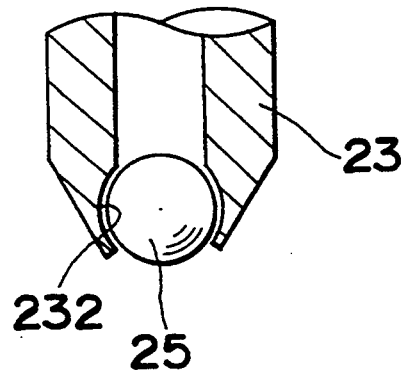
FIG. 3 is a sectional view showing an example of another construction oft members disposed in the vicinity of the polishing portion of the polishing tool shown in FIG. 1.

As shown in FIG. 2, the polishing portion 26 comprises a steel ball 25 which is made of a magnetic substance and is rotatably held at the leading end of the polishing shaft 23 which is also made of a magnetic substance. The surface of the polishing portion 26 is plated with Sn. A permanent magnet for applying a magnetic field H in the Z-direction to the space between the polishing portion 26 and the workpiece W is disposed above the steel ball 25. The steel ball 25 is held in a concave 231 positioned at the leading end of the polishing shaft 23 by the viscosity of a magnetic polishing fluid M and the magnetic force of the permanent magnet 28. A concave 232 as shown in FIG. 3 may be formed at the leading end of the polishing shaft 23 so as to mechanically hold the steel ball 25. It is preferable for the polishing portion 26 to be made of a magnetic substance so that a strong magnetic field can be applied between the polishing portion 26 and the workpiece W in an appropriate condition. Instead of the rotational steel ball 25, a stationary member may be provided in the polishing portion 26.

The driving wires 50 of the Z-direction actuator 20, the X-direction actuator 24x, and the Y-direction actuator 24y are electrically connected with a driving amplifier 51 comprising a 3CH piezoelectric driver amplifier. An example of the specifications of the 3CH piezoelectric driver amplifier is 350 V, 100 mA, and 30 kHz. The driving amplifier 51 is connected with a Z-direction signal generator 52 and an XY-direction variable phase 2-output signal generator 53. The signal generators 52 and 53 apply a voltage of a predetermined frequency to the Z-direction actuator 20, the X-direction actuator 24x, and the Y-direction actuator 24y through the driving amplifier 51, thus controlling the drive of the Z-direction actuator 20, the X-direction actuator 24x, and the Y-direction actuator 24y.

A cylindrical member 30 is installed on the lower end surface of the polishing tool main body 10. An opening 31 into which the driving wire 50 of each actuator is inserted is formed in an intermediate portion of the side surface of the cylindrical member 30. A ring-shaped connecting member 32 is screwed into a lower portion of the cylindrical member 30. A part of the inner peripheral portion of the connecting member 32 extends to a position close to the peripheral surface of the polishing shaft 23. The connecting member 32 has a fluid supply path 33 which penetrates therethrough from an outer peripheral surface thereof to the lower end surface thereof. A fluid supply pipe 34 is connected with the fluid supply path 33 near the outer peripheral surface of the connecting member 32. The magnetic polishing fluid supplied to the fluid supply pipe 34 drips from the opening of the fluid supply path 33 to the vicinity of the leading end of the peripheral surface of the polishing shaft 23.

A load cell 60 serving as a load detecting means is disposed below the polishing shaft 23. The workpiece W is placed on the load cell 60 so that the surface thereof is polished. The load cell 60 outputs a signal indicating the detected result to the driving amplifier 51 through a controller 61. Pressure applied by the Z-direction actuator 20 to the workpiece W is fed back to the driving amplifier 51.

The signal generators 52 and 53 are capable of generating a variable frequency voltage, respectively, so that the amount of abrasion can be reduced stepwise by reducing the frequency of the slight vibration of each actuator stepwise while the surface of the workpiece W is being polished. The signal generator 52 for applying a voltage to the Z-direction actuator 20 intermittently generates a voltage much greater than the voltage for slightly vibrating the Z-direction actuator 24 so as to move the polishing portion 26 away from the surface of the workpiece W for a short period of time while the surface of the workpiece W is being polished.

The actuators may slightly vibrate in only the XY-directions or in only the Z-direction.

According to the embodiment, in a manner similar to the conventional polishing method carried out by rotating a polishing shaft at a high speed, the polishing portion formed at the leading end of the polishing tool is moved along the surface of the workpiece with the polishing tool being supported by an appropriate supporting member. Means used in conventional machine tools are adopted as the supporting means and the moving means of the embodiment.

According to the configuration of the workpiece and purpose, the actuators as driving means for moving the polishing portion slightly move the polishing portion slightly in the XY-directions parallel with the surface of the workpiece and the Z-direction perpendicular thereto. The workpiece may be polished to a complicated configuration such as a curved surface by inclining the shaft of the polishing tool.

The surface of the workpiece is polished according to the configuration of the surface of the polishing portion. It is preferable for the leading end of the polishing portion to be spherical. If the polishing portion is planar, the corners thereof may be brought into contact with the surface of the workpiece depending on the inclination thereof. As a result, it is possible for the surface of the workpiece to not be polished to a desired circular arc configuration. It is preferable for the spherical surface of the leading end of the polishing portion to be composed of a sphere rotatably held at the polishing portion so that the polishing portion can uniformly polish the surface of the workpiece. The sphere is held by a mechanical means such as a bearing, a magnetic means, the viscosity of the polishing material, or a combination of the above.

The polishing material used according to the embodiment includes magnetic fluid and nonmagnetic abrasive grains dispersed and suspended in the magnetic fluid. Normally, the magnetic fluid contains fine grains of $Fe_2O_3$, having diameters of not larger than 10 nm and which are colloidally dispersed in water or oil. The magnetic grains composing the magnetic fluid such as $\alpha$-$Fe_2O_3$ (red oxide) may have a function of polishing the workpiece. Diamond, $CeO_2$ or $SiO_2$ is used as the nonmagnetic abrasive grain. Preferably, the grain diameter is not larger than 1000 nm.

Each actuator which vibrates the polishing portion 26 slightly is composed of a piezoelectric element which is expanded or contracted by applying a voltage thereto as described above. Upon application of the voltage, which periodically fluctuates, to the actuator connected with the polishing portion 26, the polishing portion 26 moves in a small region. The frequency of the slight vibration of the actuator is varied by the frequency of the voltage applied thereto. The amplitude of the slight vibration of the actuator is changed by the magnitude of the voltage applied thereto. The slight motion of the polishing portion 26 is transmitted to the polishing material. As a result, the polishing material makes a slight motion similar to the slight motion of the polishing portion 26, thus polishing the surface of the workpiece W.

The X-direction actuator 24x moves the polishing portion 26 slightly in the X-direction, i.e. the horizontal direction on the surface of the workpiece W, and the Y-direction actuator 24y moves the polishing portion 26 slightly in the Y-direction, i.e. the horizontal direction on the surface of the workpiece W and perpendicular to the X-direction. Thus, the polishing material is moved slightly in a direction parallel with the surface of the workpiece W so as to polish the surface of the workpiece W. Only the X-direction actuator 24x or only the Y-direction actuator 24y may be operated to move the polishing portion 26. In addition, both the X-direction actuator 24x and the Y-direction actuator 24y may be operated in unison. Lissajous's motion may be produced by controlling the motion phase of the polishing portion 26 in the X-direction and the Y-direction.

The X-direction actuator 24x and the Y-direction actuator 24y are capable of undergoing a large displacement and being easily controlled so that the displacement amount thereof is not changed by the influence of external pressure. A single bar-shaped flexure type piezoelectric element is sufficient to compose the X-direction actuator 24x or the Y-direction actuator 24y.

The Z-direction actuator 20 moves the polishing portion 26 in a direction perpendicular to the surface of the workpiece W, thus moving the polishing material in a direction perpendicular to the surface of the workpiece W so that the polishing material collides with the surface of the workpiece W. That is, the workpiece W is pressurized. Accordingly, pressure to be applied to the workpiece W may be controlled by changing the voltage applied to the Z-direction actuator 20.

The voltage applying means are connected with the X-direction actuator 24x, the Y-direction actuator 24y, and the Z-direction actuator 20, respectively. Thus, the leading ends of the X-direction actuator 24x and the Y-direction actuator 24y may be moved slightly by appropriately controlling the voltage applied thereto. The driving wiring, connected with the voltage applying means for applying a voltage to each actuator, is connected with the driving amplifier described above or a function generator. A construction similar to that of an actuator comprising a piezoelectric element of a conventional mechanical apparatus may be adopted as the circuit and the mechanism for driving each actuator. The motion loci of the leading ends of the X-direction and Y-direction actuators, namely, the motion locus of the polishing portion 26 may be altered from a linear motion to a complicated motion such as to Lissajous's figure by controlling the phase of the voltage to be applied to the X-direction actuator 24x and the Y-direction actuator 24y.

A flexure type piezoelectric element makes a slight motion in the XY-direction when it is flexed. A lamination type piezoelectric element makes a slight motion in the X-direction or the Y-direction when it expands or contracts. Preferably, the Z-direction actuator 20 comprises the lamination type piezoelectric element. The bar-shaped flexure type piezoelectric element is flexed by applying a control voltage to each of two pairs of electrodes which are opposed to each other and disposed on the peripheral surface. The lamination type piezoelectric element is expanded or contracted by applying a voltage to both ends thereof.

Each actuator drives the polishing portion 26 indirectly by slightly driving the polishing shaft 23, having the polishing portion 26 at the leading end thereof, in horizontal and vertical directions.

It is preferable, in order to reliably transmit the pressure applied by the Z-direction actuator 20 to the polishing portion 26 and move the polishing portion 26 freely in the XY-direction, for the connecting portion 21 for making the slight motion of the polishing portion 26 free in the XY-direction to be disposed between the Z-direction actuator 20 and the polishing portion 26 so as to dispose the operation points of the X-direction actuator 24x and the X-direction actuator 24y at positions between the connecting portion 21 and the polishing portion 26.

It is most favorable for the polishing portion 26 to make the slight motion in the Z-direction and the XY-direction simultaneously. However, the surface of the workpiece W may be polished by separately operating the XY-direction actuators 24x and 24y or the Z-direction actuator 20 depending on the objective.

The amount of abrasion of the polishing portion 26 per period of time may be reduced stepwise by decreasing the frequency of the slight vibration stepwise while the workpiece W is being polished. The present inventors found that the abrasive amount is proportional to the frequency, i.e., the higher the frequency is, the more the surface of the workpiece W is polished. Therefore, small diameter abrasive grains are used from beginning to end in the polishing operation 26. The surface of the workpiece W is roughly polished in the early stage of the polishing operation by using a high frequency, then a medium frequency is used in the middle stage thereof, and a low frequency is used in the late stage thereof.

The size of the abrasive grains may be altered depending on the grade of the desired finish, but it is very difficult to separate abrasive grains from each other according to diameter.

Nonmagnetic abrasive grains may be inserted into an appropriate position between the polishing portion 26 and the workpiece W by moving the polishing portion 26 away from the surface of the workpiece W for a short period of time while the surface of the workpiece W is being abraded. Abrasive grains are eliminated from the surface of the workpiece W as the polishing operation progresses. As a result, abrasive performance degrades or an excessive load may be applied to the abrasive grains, which causes an unfavorable surface roughness. In addition, abrasive grains are worn, i.e., the diameters of the grains become smaller, thus resulting in a deterioration in the polishing performance. Polishing material may flow between the polishing portion 26 and the surface of the workpiece W by moving the polishing portion 26 away from the surface of the workpiece W for a short period of time. A voltage much greater than the voltage for causing the slight vibration of the Z-direction actuator 20 is intermittently applied to the Z-direction actuator 20 so as to move the polishing portion 26 away from the surface of the workpiece W for a short period of time while the surface of the workpiece W is being polished.

The pressure applied by the polishing material to the workpiece W is determined by the force applied by the Z-direction actuator 20. It is preferable for the load applied to the workpiece W to be detected and for the detected value to be fed back to control the pressure applied by the Z-direction actuator 20. A pressure sensor incorporated in a conventional mechanical apparatus is sufficient to detect the load applied to the workpiece W in the vertical direction. According to the embodiment, the workpiece W is placed on a load cell to polish the surface thereof and the load applied to the workpiece W is detected by the load cell. Then, the detected value is output as an electrical signal.

The value of the load detected by the load detecting means is converted into an electrical signal so as to control the operation of the actuator. More specifically, the detected signal is processed by an appropriate electric circuit and inputted to a drive circuit for applying a voltage to the actuator. Then, the signal indicating the detected value of the load is compared with a predetermined value. According to the result of the comparison, the voltage to be applied to the Z-direction actuator 20 is appropriately varied. That is, the pressure to be applied by the Z-direction actuator 20 is controlled by feeding the signal back to the drive circuit. More specifically, the pressure to be applied by the Z-direction actuator 20 is kept at a constant high value in the early stage of the polishing operation, at a constant medium value in the middle stage thereof, and at a constant small value in the late stage thereof. It is preferable for the pressure applied by the Z-direction actuator 20 to be kept constant in each stage of the polishing operation.

It is preferable for the pressure applied by the Z-direction actuator 20 to be controlled with the pressure in the Z-direction kept constant so that vibrations are added to the pressure. Thus, the polishing material is continuously supplied to the surface of the workpiece W and continuously eliminated by the pumping operation caused by the vibrations.

The pressure to be applied by the Z-direction actuator 20 is determined according to the material quality of the workpiece W and the polishing grade desired.

The magnetic field for holding the workpiece W is applied to the space between the polishing portion 26 and the workpiece W in the Z-direction perpendicular to the surface of the workpiece W. The magnetic field is applied as follows:

A permanent magnet is mounted on the polishing shaft 23 made of a magnetic substance and having the polishing portion 26 at the leading end thereof with the magnetic pole of the permanent magnet directed along the polishing shaft 23 so that the magnetic field of the permanent magnet is applied along the polishing shaft 23 between the polishing portion 26 and the surface of the workpiece W. The permanent magnet consists, for example, of Sm—Co.

The polishing method of the embodiment is described below with reference to FIGS. 1A, 1B, 2, and 3.

The polishing tool 1 is placed on the workpiece W with the workpiece W placed on the load cell 60. The magnetic polishing material W supplied from the fluid supply pipe 34 to the leading end portion of the polishing portion 26 is magnetically held therein.

Upon periodic application of a voltage to the X-direction actuator 24x and the Y-direction actuator 24y, the block 22 in contact with the leading end of the X-direction actuator 24x and that of the Y-direction actuator 24y makes a pivotal motion in the XY-direction (horizontal direction in FIG. 1A). As a result, the polishing portion 26 undergoes a pivotal motion in a circular arc configuration about the connecting portion 21 in the XY-direction (horizontal direction in FIG. 1A) with respect to the surface of the workpiece W. The slight pivotal motion of the polishing portion 26 in the XY-direction and the Z-direction is transmitted to the magnetic polishing material M. As a result, the magnetic polishing material M polishes the surface of the workpiece W. The magnetic polishing material M applies pressure to the workpiece W in the space between the leading end portion of the polishing portion 26 and the workpiece W, thus polishing the workpiece W. Consequently, the surface of the workpiece W is polished in the region approximately equivalent to the configuration corresponding to the leading end portion of the polishing portion 26.

Figure 4A:
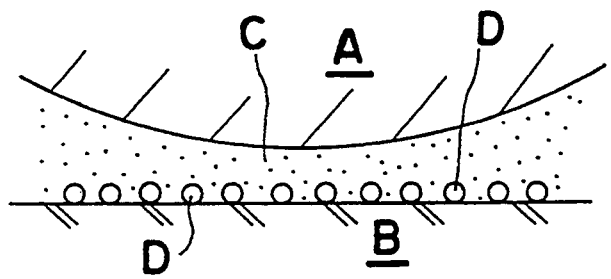
FIGS. 4A and 4B are descriptive views showing the distribution state of nonmagnetic abrasive grains, dispersed in magnetic fluid, supplied to the surface of a workpiece when no magnetic field is applied.
Figure 4B:
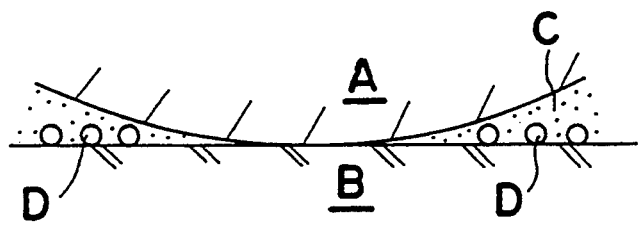

According to the polishing method of the embodiment, the polishing material consisting of magnetic fluid and nonmagnetic abrasive grains dispersed in the magnetic fluid is magnetically held between the polishing portion 26 and the workpiece W. If there is no magnetic field in the space between the polishing portion 26 (A) and the workpiece W (B), as shown in FIG. 4A, the nonmagnetic abrasive grains D dispersed in the magnetic fluid C under the polishing portion A (for example, a steel ball) and the polishing portion A is pressed against the workpiece B (for example, glass material), the nonmagnetic abrasive grains D move away from the space between the polishing portion A and the workpiece B as shown in FIG. 4B. But if a magnetic field is applied to the space between the polishing portion A and the workpiece B, the magnetic fluid C is attracted thereto, thus preventing nonmagnetic abrasive grains D from moving away from the space between the polishing portion A and the workpiece B.

Consequently, the amount of abrasion can be accurately controlled. For example, the amount of abrasion is proportional to the polishing time and to the vibration frequency of the slight vibration. That is, the amount of abrasion can be accurately controlled by adjusting the polishing time and vibration frequency. Therefore, computer controlled polishing may be used.

Figure 6:
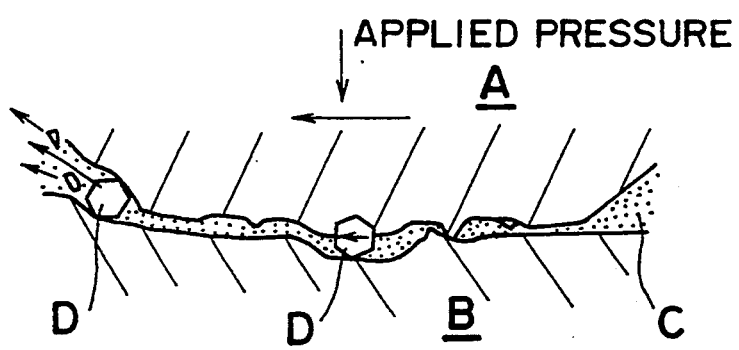
FIG. 6 is a descriptive view showing an abrasive state when no magnetic field is applied.
Figure 7:
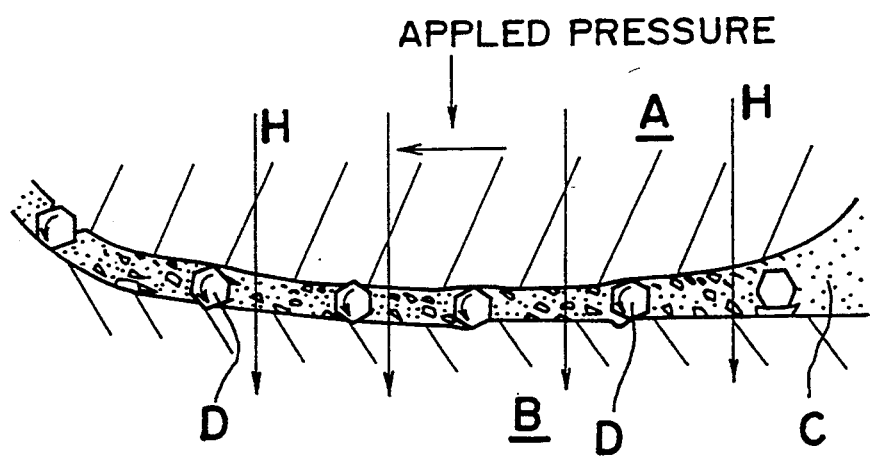
FIG. 7 is a descriptive view showing an abrasive state when a magnetic field is applied in a direction perpendicular to the surface of the workpiece.
Figure 8:
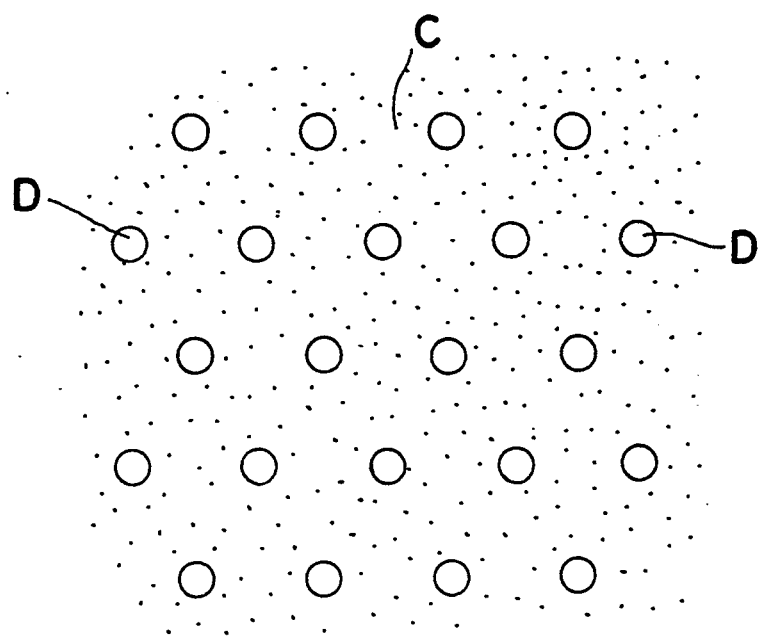
FIG. 8 is a descriptive view showing a distribution state of nonmagnetic abrasive grains dispersed in magnetic fluid when a magnetic field is applied in a direction perpendicular to the surface of the workpiece.

The surface roughness of the workpiece W is favorable and constant. If the magnetic field is not applied to the space between the polishing portion A and the workpiece B, the dotted nonmagnetic abrasive grains D partially scrape the surface of the workpiece B and the surface of the polishing portion A as shown in FIG. 6, thus polishing it unevenly. But when the magnetic field is applied, the nonmagnetic abrasive grains D (which are held sufficiently in the magnetic fluid) uniformly abrade the surface of the workpiece B as shown in FIG. 7.

Figure 5A:
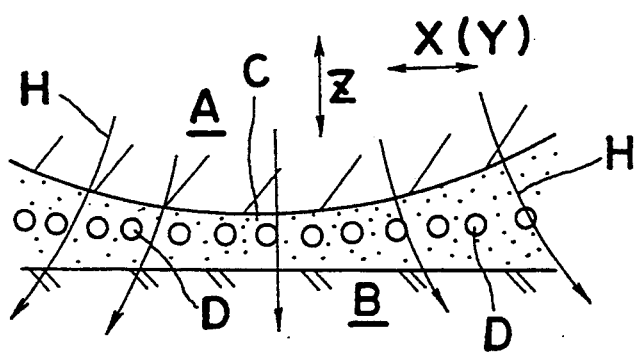
FIGS. 5A and 5B are descriptive views showing the distribution state of nonmagnetic abrasive grains, disposed in magnetic fluid, supplied to the polishing surface when a magnetic field is applied in a direction perpendicular to the surface of the workpiece.
Figure 5B:
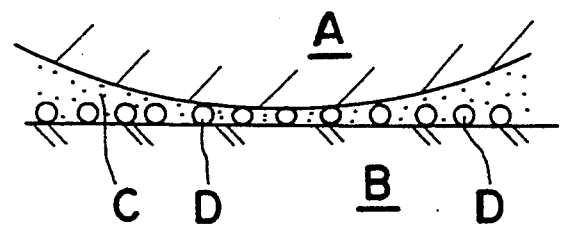

When a magnetic field M is applied in the Z-direction perpendicular to the surface of the workpiece W as shown in FIG. 5A, the nonmagnetic abrasive grains D dispersed in the magnetic fluid C become uniformly dispersed (in a 2-dimensional triangular structure) due to repulsive forces among the nonmagnetic abrasive grains D. As a result, upon contact between the polishing portion A and the workpiece B, the nonmagnetic abrasive grains D are appropriately dispersed on the surface of the workpiece B.

The whole surface of the workpiece W to be polished is polished by moving the polishing tool 1 horizontally or three-dimensionally according to a predetermined configuration to be formed. Thus, a desired configuration such as a planar surface, a spherical surface or a free curved surface may be obtained by polishing the entire surface of the workpiece W.

Meanwhile, the load cell 60 on which the workpiece W is placed detects the pressure applied by the polishing portion 26 to the workpiece W through the magnetic polishing material M. A signal indicating the applied load value is fed back to the driving amplifier 51 through the controller 61. Therefore, if the pressure applied to the workpiece W exceeds a predetermined value, the driving amplifier 51 applies a lowered voltage to the Z-direction actuator 20 to reduce the pressure applied to the workpiece W. If the pressure applied to the workpiece W does not exceed the predetermined value, the driving amplifier 51 applies an increased voltage to the Z-direction actuator 20 to increase the pressure applied to the workpiece W. In one polishing process for polishing the surface of the workpiece W in a region having a configuration which is approximately equivalent to the configuration corresponding to the leading end portion of the polishing portion 26, the pressure is decreasingly applied thereto as time elapses. The load cell 60 detects the reduction of the pressure and feeds a signal indicating the detected result back to the driving amplifier 51 so that the pressure can be constantly applied to the workpiece W. The controller 61 is capable of sending a control signal to the driving amplifier 51 so that a great pressure is applied to the workpiece W in the early stage of the polishing operation, a medium pressure is applied in the meddle stage thereof, and a small pressure is applied in the late stage thereof.

The result obtained by polishing the surface of the workpiece W under the following conditions are described below.

Steel ball: 5 mm in diameter, made of JIS SUJ2

Magnetic field: $6.3 \times 10^4$ A/m (H1), $10.3 \times 10^4$ A/m (H2)

0 A/m (H3)

Operated actuator: Z-direction actuator

Magnetic fluid: W-45 (Water Based) manufactured by Taiho Industry Co., Ltd.

Nonmagnetic abrasive grain: diamond abrasive grain of 0–1 μm

Result 1

Figure 9:
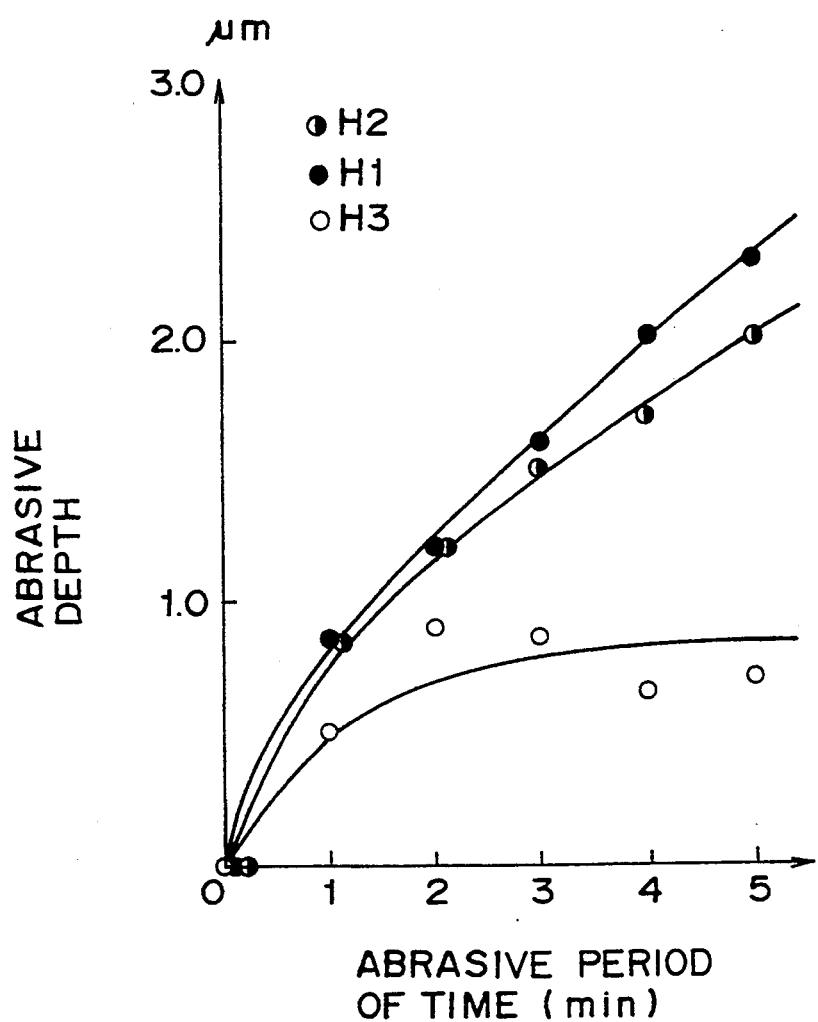
FIG. 9 is a graph showing the relationship between the polishing time and abrasive depth obtained as a result of a polishing operation according to an embodiment of the present invention.

The relationship between the polishing time and the abrasive depth (abrasive rate) was as shown in FIG. 9. The pressure applied to the workpiece W was $4.9 \times 10^{-2}$N. The frequency was 20 Hz. The amount of nonmagnetic abrasive grains contained in the polishing material was 4 vol %.

Result 2

Figure 10:
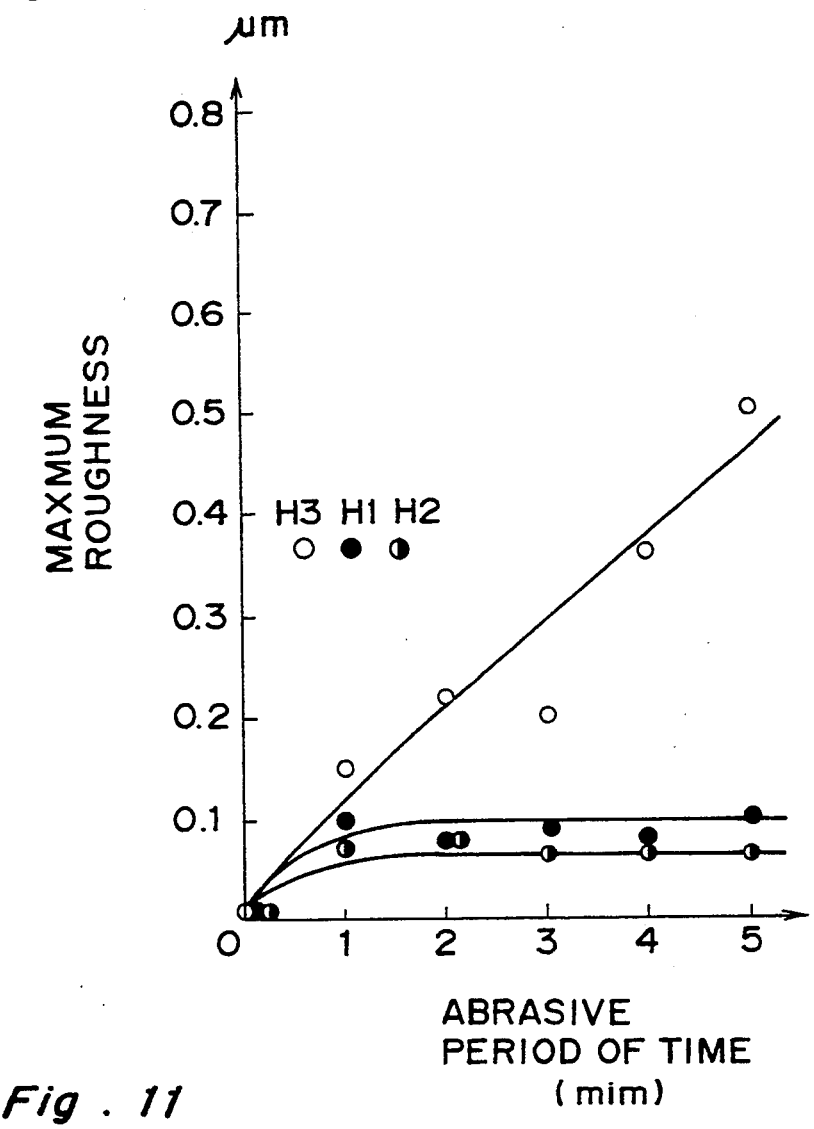
FIG. 10 is a graph showing the relationship between polishing time and surface roughness obtained as a result of a polishing operation according to an embodiment of the present invention.

The relationship between the polishing time and the abrasive roughness was as shown in FIG. 10. The pressure applied to the workpiece W was $4.9 \times 10^{-2}$N. The frequency was 20 Hz. The amount of nonmagnetic abrasive grains contained in the polishing material was 4 vol %.

Result 3

Figure 11:
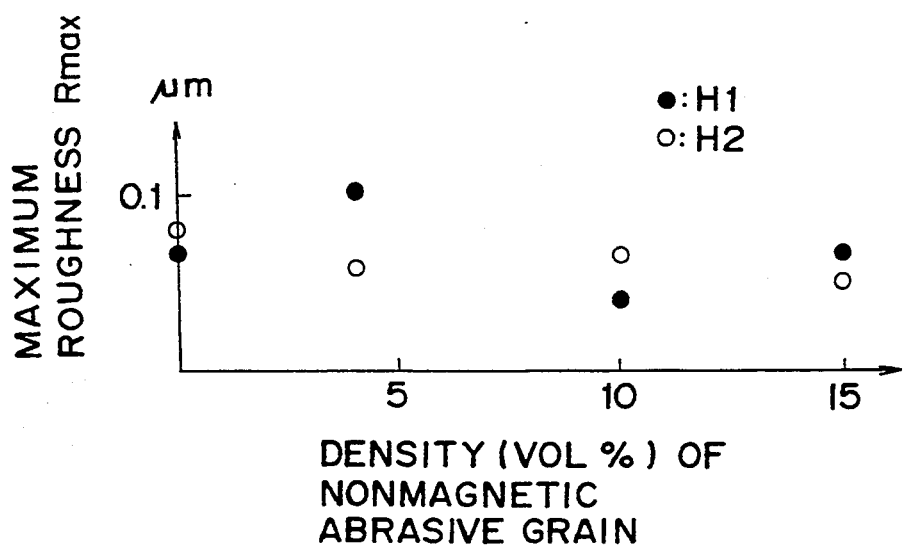
FIG. 11 is a graph showing the relationship between the density ($\rho$) of nonmagnetic abrasive grains and surface roughness obtained as a result of a polishing operation according to an embodiment of the present invention.

The relationship between the density ($\rho$) of nonmagnetic abrasive grains and the surface roughness was as shown in FIG. 11. The pressure applied to the workpiece W was $5 \times 10^{-2}$N. The frequency was 20 Hz. The polishing time was five minutes.

Result 4

Figure 12:
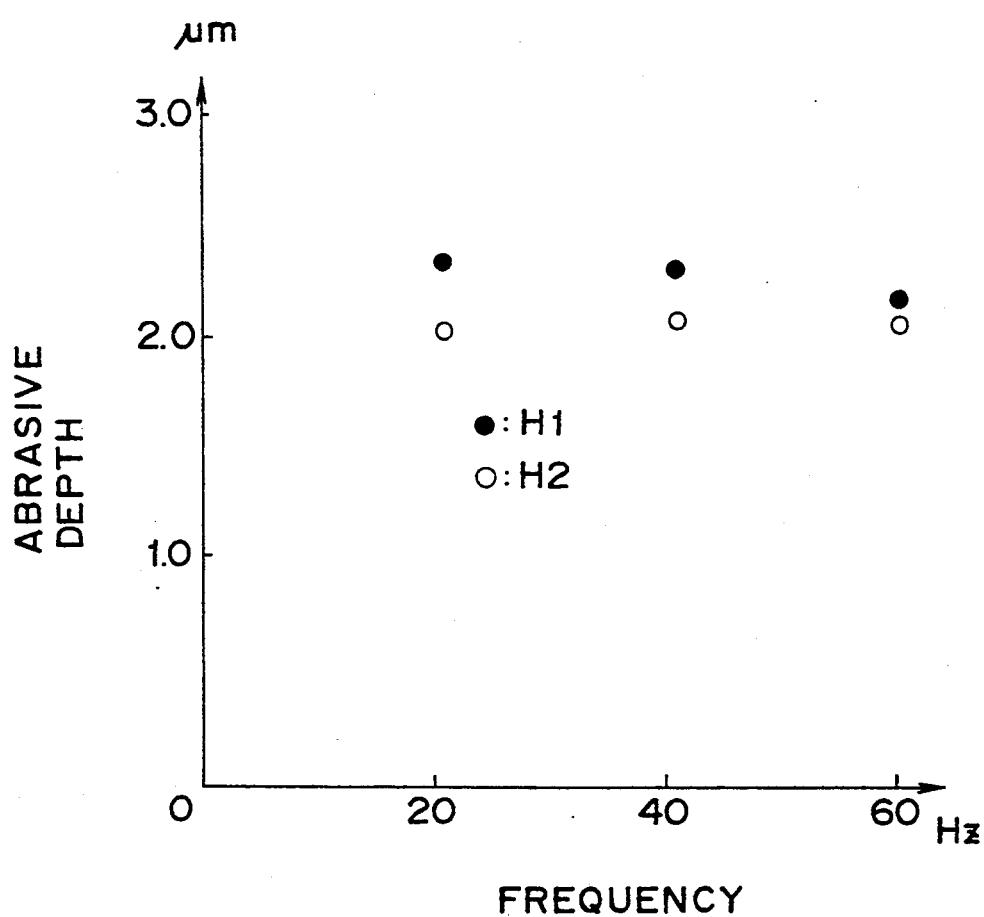
FIG. 12 is a graph showing abrasive depths obtained at frequencies of 20 Hz, 40 Hz, and 60 Hz.

The workpiece W was polished to the abrasive depths shown in FIG. 12 at frequencies of 20 Hz, 40 Hz, and 60 Hz. The polishing time was five minutes, two minutes and 30 seconds, and one minute and 40 seconds, respectively, for the frequencies of 20 Hz, 40 Hz, and 60 Hz. The pressure applied to the workpiece W was $4.9 \times 10^{-2}$N. The amount of nonmagnetic abrasive grains contained in the polishing material was 4 vol %.

Result 5

Figure 13:
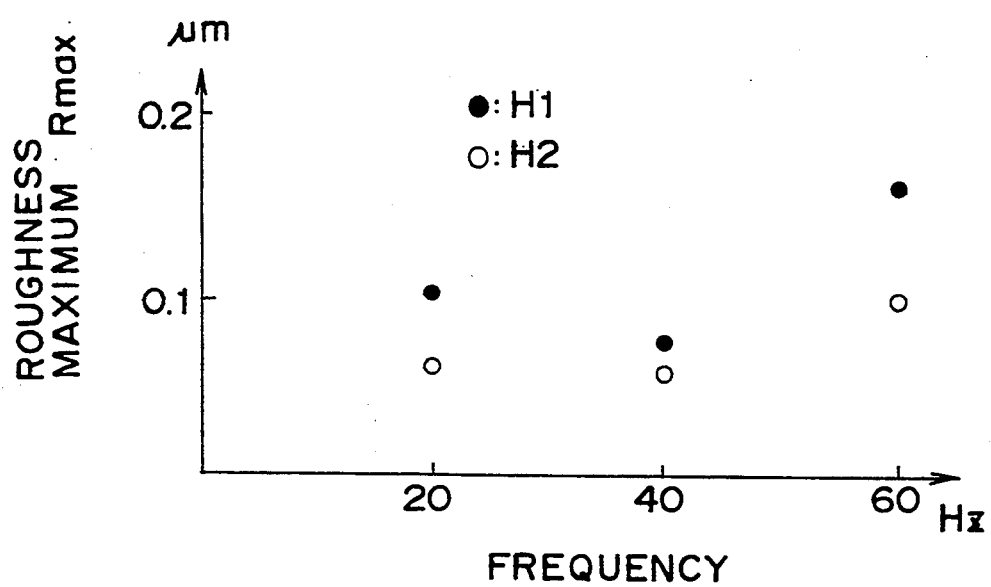
FIG. 13 is a graph showing surface roughness at frequencies of 20 Hz, 40 Hz, and 60 Hz.

The surface roughnesses were as shown in FIG. 13 when the frequencies were 20 Hz, 40 Hz, and 60 Hz, respectively. The polishing times were five minutes, two minutes and 30 seconds, and one minute and 40 seconds, respectively, for the frequencies of 20 Hz, 40 Hz, and 60 Hz. The pressure applied to the workpiece W was $4.9 \times 10^{-2}$N. The amount of nonmagnetic abrasive grains contained in the polishing material was 4 vol %.

Result 6

Figure 14:
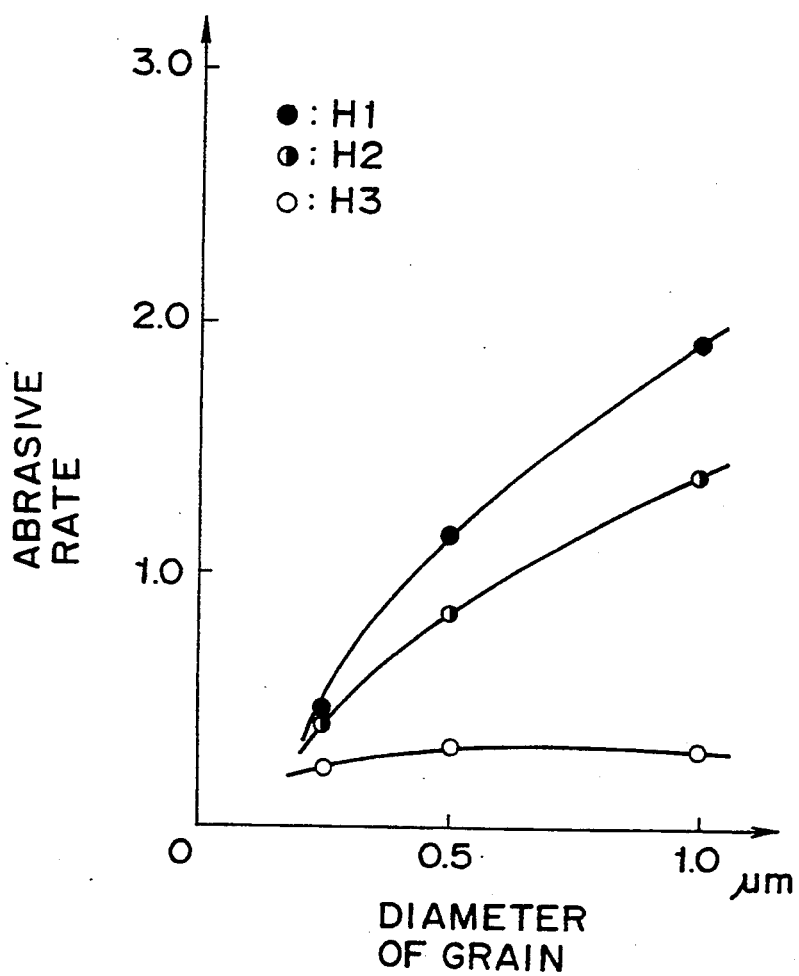
FIG. 14 is a graph of a relationship between abrasive grain diameter and abrasive rate.

The relationship between the diameters of abrasive grains and the abrasive rate was as shown in FIG. 14. The frequency was 20 Hz. The pressure applied to the workpiece W was $4.9 \times 10^{-2}$N. The amount of nonmagnetic abrasive grains contained in the polishing material was 4 vol %. The abrasive rate is expressed by [polished volume (ms)]/[load(N)×slide distance (m)].

As indicated in Results 1 through 6, the abrasive depth and surface roughness are preferable. As shown in FIGS. 9 and 10, the abrasive amount is proportional to abrasion time. As shown in FIGS. 12 and 13, the amount of abrasion is proportional to the frequency at which the actuators are vibrated.

The abrasive amount per period of time can be easily reduced stepwise by decreasing the frequency of the slight vibration stepwise without altering the size of abrasive grains while the workpiece W is being polished.

The abrasive grains are inserted on the surface of the workpiece W by moving the polishing portion 26 away from the surface of the workpiece W for a short period of time. Thus, the polishing performance can be prevented from deterioration such that a favorable surface roughness is attained.

Since the leading end of the polishing portion 26 is spherical in the above embodiment, the corners of the polishing portion 26 can be prevented from contacting the surface of the workpiece W. In addition, the width of the polishing portion 26 is substantially greater than that of a plane having the same width. Therefore, the polished area of the spherical surface is greater than that of the plane.

The spherical surface of the leading end of the polishing portion 26 is composed of a rotatable sphere. Thus, the polishing portion 26 does not become worn.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

I claim:

1. A method for polishing a slight region of a surface of a workpiece, comprising the steps of:

applying a magnetic field, in a Z-direction perpendicular to the surface of the workpiece, to a space between a polishing portion disposed at a leading end of a polishing tool and the workpiece to magnetically hold a polishing material in the space between the polishing portion and the workpiece, the polishing material including magnetic fluid and nonmagnetic abrasive grains disposed in the magnetic fluid;

applying pressure mechanically in the space between the surface of the workpiece and the polishing portion;

operating an actuator or actuators, each actuator comprising a piezoelectric element, to cause the polishing portion disposed at the leading end of the polishing tool to undergo a slight movement in at least one of an XY-direction parallel with the surface of the workpiece and the Z-direction to polish the slight region of the surface of the workpiece with the polishing material; and stepwise reducing an amount of abrasion per period of time by stepwise decreasing a frequency of the slight movement of the polishing portion while the workpiece is being polished.

2. A method for polishing a slight region of a surface of a workpiece, comprising the steps of:

applying a magnetic field, in a Z-direction perpendicular to the surface of the workpiece, to a space between a polishing portion disposed at a leading end of a polishing tool and the workpiece to magnetically hold a polishing material in the space between the polishing portion and the workpiece, the polishing material including magnetic fluid and nonmagnetic abrasive grains disposed in the magnetic fluid;

applying pressure mechanically in the space between the surface of the workpiece and the polishing portion;

operating an actuator or actuators, each actuator comprising a piezoelectric element, to cause the polishing portion disposed at the leading end of the polishing tool to undergo a slight movement in at least one of an XY-direction parallel with the surface of the workpiece and the Z-direction to polish the slight region of the surface of the workpiece with the polishing material;

stepwise reducing an amount of abrasion per period of time by stepwise decreasing a frequency of the slight movement of the polishing portion while the workpiece is being polished;

moving the polishing portion away from the surface of the workpiece for a short period of time to let nonmagnetic abrasive grains flow in the space between the surface of the workpiece and the polishing portion; and wherein the leading end of the polishing portion comprises a rotatable sphere.

* * * * *

UNITED STATES PATENT AND TRADEMARK OFFICE
CERTIFICATE OF CORRECTION

PATENT NO. : 5,404,680
DATED : April 11, 1995
INVENTOR(S) : Shinichi MIZUGUCHI et al.

It is certified that error appears in the above-indentified patent and that said Letters Patent is hereby corrected as shown below:

On the cover page, in item [63], "Pat. No. 5,317,840" should read --abandoned--.

Signed and Sealed this

Eighth Day of August, 1995

Attest:

BRUCE LEHMAN

*Attesting Officer*    *Commissioner of Patents and Trademarks*